United States Patent
Massoudi et al.

(10) Patent No.: US 11,257,112 B1
(45) Date of Patent: Feb. 22, 2022

(54) AD TARGETING AND DISPLAY OPTIMIZATION BASED ON SOCIAL AND COMMUNITY DATA

(75) Inventors: Farhad Massoudi, San Francisco, CA (US); David Robert Gentzel, Mill Valley, CA (US)

(73) Assignee: LivingSocial, Inc., Washington, DC (US)

( * ) Notice: Subject to any disclaimer, the term of this patent is extended or adjusted under 35 U.S.C. 154(b) by 798 days.

(21) Appl. No.: 12/580,176

(22) Filed: Oct. 15, 2009

(51) Int. Cl.
*G06Q 30/02* (2012.01)

(52) U.S. Cl.
CPC ................. *G06Q 30/0251* (2013.01)

(58) Field of Classification Search
CPC ........... G06Q 30/0269; G06Q 30/0241; G06Q 30/0242; G06Q 30/0251; G06Q 30/0254; G06Q 30/02
USPC .......... 705/14.46, 14.49, 14.52, 14.55, 14.66
See application file for complete search history.

(56) References Cited

U.S. PATENT DOCUMENTS

| | | | |
|---|---|---|---|
| 6,430,539 B1* | 8/2002 | Lazarus et al. | 705/7.31 |
| 7,433,832 B1 | 10/2008 | Bezos et al. | |
| 7,970,657 B2 | 6/2011 | Morgenstern | |
| 8,171,128 B2 | 5/2012 | Zuckerberg et al. | |
| 8,499,247 B2 | 7/2013 | Niyogi et al. | |
| 8,666,812 B1* | 3/2014 | Gandhi | 705/14.52 |
| 8,898,579 B2 | 11/2014 | Niyogi et al. | |
| 10,510,043 B2 | 12/2019 | Gerace et al. | |
| 2002/0123928 A1* | 9/2002 | Eldering | G06Q 30/0255 705/14.52 |
| 2003/0177063 A1 | 9/2003 | Currans et al. | |
| 2005/0114526 A1 | 5/2005 | Aoyama | |
| 2005/0137958 A1* | 6/2005 | Huber | H04N 21/812 705/37 |
| 2006/0042483 A1 | 3/2006 | Work et al. | |
| 2006/0193008 A1 | 8/2006 | Osaka et al. | |
| 2006/0212305 A1 | 9/2006 | Bogle et al. | |
| 2006/0271425 A1 | 11/2006 | Goodman et al. | |

(Continued)

FOREIGN PATENT DOCUMENTS

JP  2005107292 A  4/2005

OTHER PUBLICATIONS

Hodes et al., "Composable ad hoc location-based services for heterogeneous mobile clients", Wireless Networks 5, pp. 411-427 (1999) (Year: 1999).*

(Continued)

*Primary Examiner* — Christopher B Tokarczyk
(74) *Attorney, Agent, or Firm* — Alston & Bird LLP

(57) ABSTRACT

A system and method for optimizing advertisements for display to users comprising receiving a request for an advertisement wherein the request comprises information about a user to whom the advertisement is to be displayed; determining at least one community of which the user is a member; determining a conditional probability that the user will interact with the advertisement; responsive to the conditional probability exceeding a threshold, determining community data to present with the advertisement and providing for display to the user the advertisement and the community data; responsive to the providing of the advertisement, receiving an indication of activity at a client system related to the advertisement or community data; and storing the indication in a storage medium.

9 Claims, 7 Drawing Sheets

(56) References Cited

U.S. PATENT DOCUMENTS

| | | | |
|---|---|---|---|
| 2007/0121843 A1 | 5/2007 | Atazky et al. | |
| 2008/0033776 A1 | 2/2008 | Marchese | |
| 2008/0097843 A1* | 4/2008 | Menon | G06Q 30/0244 705/14.1 |
| 2008/0109491 A1 | 5/2008 | Gupta | |
| 2008/0140674 A1 | 6/2008 | Ishikawa | |
| 2008/0147482 A1 | 6/2008 | Messing | |
| 2008/0183558 A1* | 7/2008 | Koran | G06Q 30/0256 705/14.54 |
| 2008/0189122 A1 | 8/2008 | Coletrane et al. | |
| 2008/0189169 A1 | 8/2008 | Turpin et al. | |
| 2008/0209322 A1 | 8/2008 | Kaufman | |
| 2009/0006375 A1 | 1/2009 | Lax et al. | |
| 2009/0019053 A1 | 1/2009 | Burgess | |
| 2009/0119167 A1 | 5/2009 | Kendall et al. | |
| 2009/0119173 A1 | 5/2009 | Parsons et al. | |
| 2009/0171748 A1 | 7/2009 | Aven et al. | |
| 2009/0172551 A1 | 7/2009 | Kane et al. | |
| 2009/0217178 A1 | 8/2009 | Niyogi et al. | |
| 2009/0228335 A1 | 9/2009 | Niyogi et al. | |
| 2013/0055097 A1 | 2/2013 | Soroca et al. | |
| 2013/0297623 A1 | 11/2013 | Niyogi et al. | |
| 2015/0154309 A1 | 6/2015 | Niyogi et al. | |

OTHER PUBLICATIONS

Yan, J et al., "How Much Can Behavioral Targeting Help Online Advertising?" International World Wide Web Conference Committee (IW3C2), WWW 2009, Madrid, Spain, Apr. 20-24, 2009, pp. 261-270, ACM.

Non-final Office Action dated Sep. 28, 2011 in U.S. Appl. No. 12/393,795, 40 pages.

Final Office Action dated Jul. 17, 2012 in U.S. Appl. No. 12/393,795, 39 pages.

Non-final Office Action dated Jul. 24, 2013 in U.S. Appl. No. 12/393,795, 46 pages.

Final Office Action dated Feb. 5, 2014 in U.S. Appl. No. 12/393,795, 39 pages.

Non-final Office Action dated Oct. 12, 2011 in U.S. Appl. No. 12/277,237, 8 pages.

Notice of Allowance dated Jun. 19, 2013 in U.S. Application No. 12/277,237, 11 pages.

Non-final Office Action dated Oct. 23, 2013 in U.S. Application No. 13/932,224, 13 pages.

Final Office Action dated Apr. 11, 2014 in U.S. Appl. No. 13/932,224, 13 pages.

Notice of Allowance dated Jul. 23, 2014 in U.S. Appl. No. 13/932,224, 6 pages.

Final Office Action dated Mar. 8, 2016 in U.S. Appl. No. 12/393,795.

Non-final Office Action dated Oct. 8, 2015 in U.S. Appl. No. 12/393,795.

Notice of Allowance dated Jan. 15, 2016 in U.S. Appl. No. 14/551,843.

International Search Report and Written Opinion for corresponding International Application No. PCT/US2009/035314, dated Oct. 8, 2009.

Non-final Office Action dated Jul. 30, 2015 in U.S. Appl. No. 14/551,843, 19 pages.

* cited by examiner

Advertiser X

BIG SALE THIS WEEKEND

50% All of your Holiday Gifts!

2,498 Baton Rouge Elves have RSVP'd to the SALE

Fig. 6

AD TARGETING AND DISPLAY OPTIMIZATION BASED ON SOCIAL AND COMMUNITY DATA

BACKGROUND

Field of Art

The present disclosure is directed to serving advertisements based on a determination that the advertisement has a performance efficacy exceeding a pre-determined threshold and wherein the advertisement comprises community data.

Description of the Art

Advertising on the internet conventionally maximizes the effective cost per thousand impressions (CPM) where each ad has some bid, eCPM (e.g., a calculation that reveals how much each thousand units of an advertisement inventory costs an advertiser such as campaign cost divided by number of thousand advertisement units). The ranking of advertising is computed by multiplying bid eCPM's by quality scores. The ads with the highest ad rank are given preferential treatment. In the case of advertising opportunities where only one ad is displayed, preferential treatment means the highest rank ad is displayed more often than lower ranking ads. In a situation where multiple ads are displayed, preferential treatment means the ad is displayed more prominently than the others.

Maximizing the efficacy of an advertisement requires that an advertisement engages the user. Accomplishing this goal makes the advertising provided more valuable.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

FIG. 6 is an example screenshot of an advertisement wherein community data is presented in the advertisement.

DETAILED DESCRIPTION

Figure 1:
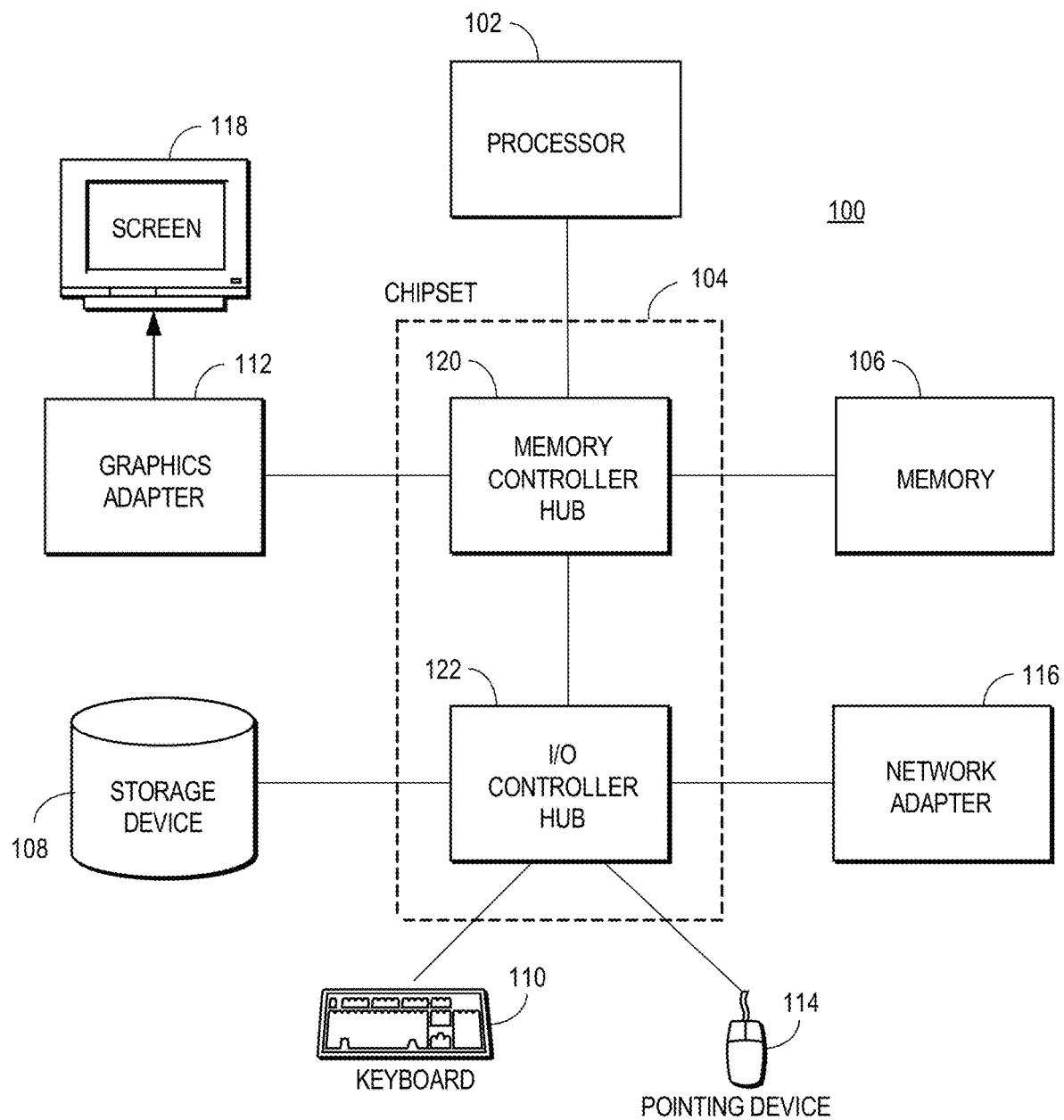
FIG. 1 is a high-level block diagram of a computer.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimable subject matter.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

As further described herein, a system (and method) is configured to serve advertisements to display to users wherein the advertisements include community data. Further, a system (and method) is configured to determine whether to serve an advertisement and if so, which community data to include in the advertisement for the user. Using data gathered from actions at a client system associated with advertisements, advertising networks can improve both their advertising display and advertising selection algorithms to show advertisements with which a user is more likely to engage.

Community data is any information about activities at a client system associated with advertisements. Community data includes attributes about the users interacting with the advertisements. Attributes are known through browsing history, search terms entered at a search engine, cookies and other metadata. Attributes are also known by a user entering information at a website, for example, when making a purchase at a website to which the user navigated by clicking through an advertisement. Attributes of a user are used to determine communities to which the user belongs. A community is a grouping of users by one or more attributes of the users. Attributes that are used to determine communities include, among others, age, profession, gender, family status, interests, hobbies, socio-economic status, IP address, etc. Examples of communities include men, women, retired people, singles, accountants, mountain bikers, parents, Generation X, Generation Y, mothers, fathers, single mothers, retired mountain bikers, female accountants, lawyers in Denver, and single mothers in the Midwest.

Community data is presented in an advertisement in various formats including for example, using text, graphically or a combination of both. Community data may be presented as an endorsement such as "75% of Bay Area accountants shopped at Honda.com" or an interactive presentation such as a trivia question. An example trivia question might be, "What percent of Bay Area accountants have shopped at Honda.com?" The user is then given three options (e.g., "A. 33%; B. 62%; or C. 75%") and upon selecting one of the options, the user is shown the correct answer and possibly a chart showing what other users guessed when presented with the same question. The response to a user selecting an option may be presented in the advertisement or after directing user to the advertiser's site.

System Architecture

FIG. (FIG. 1 illustrates one embodiment of a computer (or computer system) 100 configured for operation, e.g., in FIGS. 2 through 6, as further described herein. Illustrated are at least one processor 102 coupled to a chipset 104. Also coupled to the chipset 104 are a memory 106, a storage device 108, a keyboard 110, a graphics adapter 112, a pointing device 114, and a network adapter 116. A display 118 is coupled to the graphics adapter 112. In one embodiment, the functionality of the chipset 104 is provided by a memory controller hub 120 and an I/O controller hub 122. In another embodiment, the memory 106 is coupled directly to the processor 102 instead of the chipset 104.

The storage device 108 is any device capable of holding data, like a hard drive, compact disk read-only memory (CD-ROM), DVD, or a solid-state memory device. The memory 106 holds instructions and data used by the processor 102. The pointing device 114 may be a mouse, track ball, or other type of pointing device, and is used in combination with the keyboard 110 to input data into the computer system 100. The graphics adapter 112 is configured to provide for display on a screen (or display) 118 images and other information. The network adapter 116 couples the computer system 100 to a local or wide area network.

As is known in the art, a computer 100 can have different and/or other components than those shown in FIG. 1. In addition, the computer 100 can lack certain illustrated components. In one embodiment, a computer 100 lacks a keyboard 110, pointing device 114, graphics adapter 112, and/or screen 118. Moreover, the storage device 108 can be local and/or remote from the computer 100 (such as embodied within a storage area network (SAN)).

It is noted that computer 100 may also refer to a configuration having more than one physical computer, each of which is communicatively coupled together to form a logical computer configuration. The computers themselves may have generally high performance CPUs, with 1 G or more of memory, and 100 G or more of disk storage. Of course, other types of computers can be used, and it is expected that as more powerful computers are developed in the future, they can be configured in accordance with the teachings here. The functionality implemented by any of the elements can be provided from computer program products that are stored in tangible computer readable storage mediums (e.g., RAM, hard disk, or optical/magnetic media), or by equivalent implementations in hardware and/or firmware.

As is known in the art, the computer 100 is adapted to execute computer program engines (or modules) for providing functionality described herein. As used herein, the term "engine" refers to computer program logic utilized to provide the specified functionality. Thus, an engine can be implemented in hardware, firmware, and/or software. In one embodiment, program engines, such as an efficacy engine 205 and an advertising engine 210, further described with FIG. 2, are stored on the storage device 108, loaded into the memory 106, and executed by the processor 102.

Embodiments of the entities described herein can include other and/or different engines than the ones described here. In addition, the functionality attributed to the engines can be performed by other or different engines in other embodiments. Moreover, this description occasionally omits the term "engine" for purposes of clarity and convenience.

Figure 2:
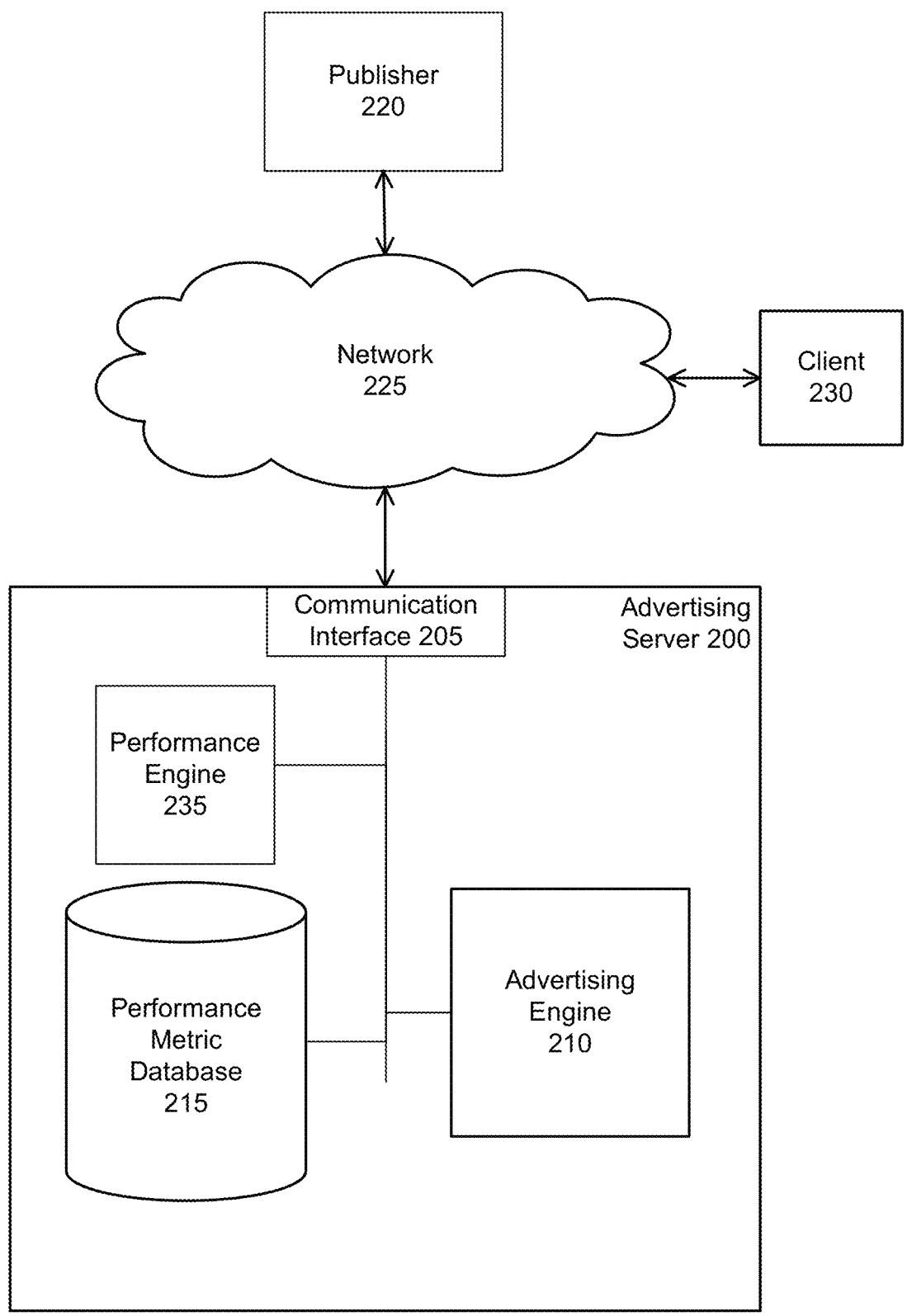
FIG. 2 illustrates a system architecture according to one embodiment.

FIG. 2 is a depiction of the system architecture according to one embodiment. The system comprises a publisher 220, client 230 and an advertising server 200 which communicate via a network 225. The advertising server 200 comprises a communication interface 205, an advertising engine 210, a performance metric database 215 and a performance engine 235. For simplicity and ease of discussion, only one advertising server 200 is shown. However, it is noted that in practice there may be multiple advertising servers 200 configured to function together as described herein.

The advertising server 200 is implemented as server program executing on one or more server-class computers, such as the one illustrated and described with respect to FIG. 1. For example the advertising engine 210 and performance engine 235 may be configured as software instructions (a module) stored in the storage device 108 and/or the memory 106 and executable by the processor 102. Likewise, the performance metric database 215 may be configured for storage within the storage device 108 and associated software instructions are executable by the processor 102. Alternatively, the advertising server 200 can be implemented in dedicated hardware, using custom designed circuitry to implement the logic of the operations described herein. The advertising server 200 communicates with the publisher 220 and client 230 via the communication interface 205. It is noted that references to programs herein include software comprising instructions that are stored in a storage device, e.g., storage device 108, and/or memory, e.g., the memory 106, and executable by a processor, e.g., the processor 102.

The client 230 is a browser on a computing device. The browser is any browser known in the art, for example, MICROSOFT INTERNET EXPLORER™ or MOZILLA FIREFOX™. The client 230 computing device is any computing device, including mobile computing devices, known in the art, for example, a personal computer, a notebook computer or a smart phone. The client 230 computing device may be configured similar to the computing device shown and described with respect to FIG. 1. For simplicity and ease of discussion, only one client 230 is shown. It is noted however, that the disclosed configuration functions with very large numbers (e.g., millions) of clients 230, or as many as can be supported by the hardware and software implementation, can be in communication with the advertising server 200.

The network 225 is any local or wide area network, wired or wireless. Examples of a network 225 include, for example, the Internet, an intranet, or a personal area network.

The publisher 220 communicates with the client 230 and advertising server 200 via the network 225. The publisher 220 provides content to the client 230 and requests advertisements from the advertising server 200. The publisher 220 is a web server implemented as a server program executing on one or more server-class computers, such as the one illustrated and described with respect to FIG. 1. For simplicity and ease of discussion, only one publisher 220 is shown. It is noted however, that the disclosed configuration functions with numerous publishers 220 in communication with the advertising server 200 and with the large numbers of clients 230.

The performance metric database 215 stores metrics which are indicative of the efficacy of an advertisement. The stored performance metrics include the rate of activities at a client system associated with advertisements. Activities at the client system associated with the advertisement include a mouse-over (or hover) the advertisement or a community data overlay, clicking on the advertisement or a community data overlay, browsing at the site linked to by clicking on the advertisement or a community data overlay and making a purchase at the site linked to by clicking (or selecting) the advertisement or a community data overlay. The rate at which users click through the advertisement or a community data overlay is conventionally known as the click-through-rate (CTR). The rate at which users make a purchase at the site linked to by clicking (or selecting) the advertisement or a community data overlay is conventionally known as the conversion rate. The metrics stored in the performance metric database 215 are determined by the performance engine 235.

The performance metric database 215 further stores attributes of the users. The performance metric database 215 may also be located remotely from the advertising server 200 and be accessed via the network 225.

The performance engine 235 determines the performance metrics for advertisements. Community metrics and display metrics are two types of performance metrics. There can be multiple versions of an advertisement, each version comprising different community data. Community metrics are the overall performance of all versions of an advertisement and also how all versions together of the advertisement perform when shown to various communities.

Additionally, display metrics are determined. Display metrics measure the performance of the various versions of the advertisement, each versions incorporating different community data, when shown to all users and also the performance of each version when displayed to individual communities.

In one embodiment the performance of advertisements is determined responsive to receipt of indications of additional actions at a client system associated with advertisements. An indication is a signal which corresponds to the activity at the client system. Alternatively, the performance for an advertisement is determined in response to receipt of a request for the advertisement. In such an embodiment, indications of actions at a client system associated with advertisements are stored and retrieved for determining performance when a request for that advertisement is received. In yet another alternative, the performance is determined periodically, such as for example, once a day, once a week or once a month.

Upon receiving a request for an advertisement, the advertising engine 210 determines a conditional probability that the user to whom the advertisement will be shown will interact with the advertisement. The determination of conditional probability is discussed further in reference to FIG. 3.

Figure 3:
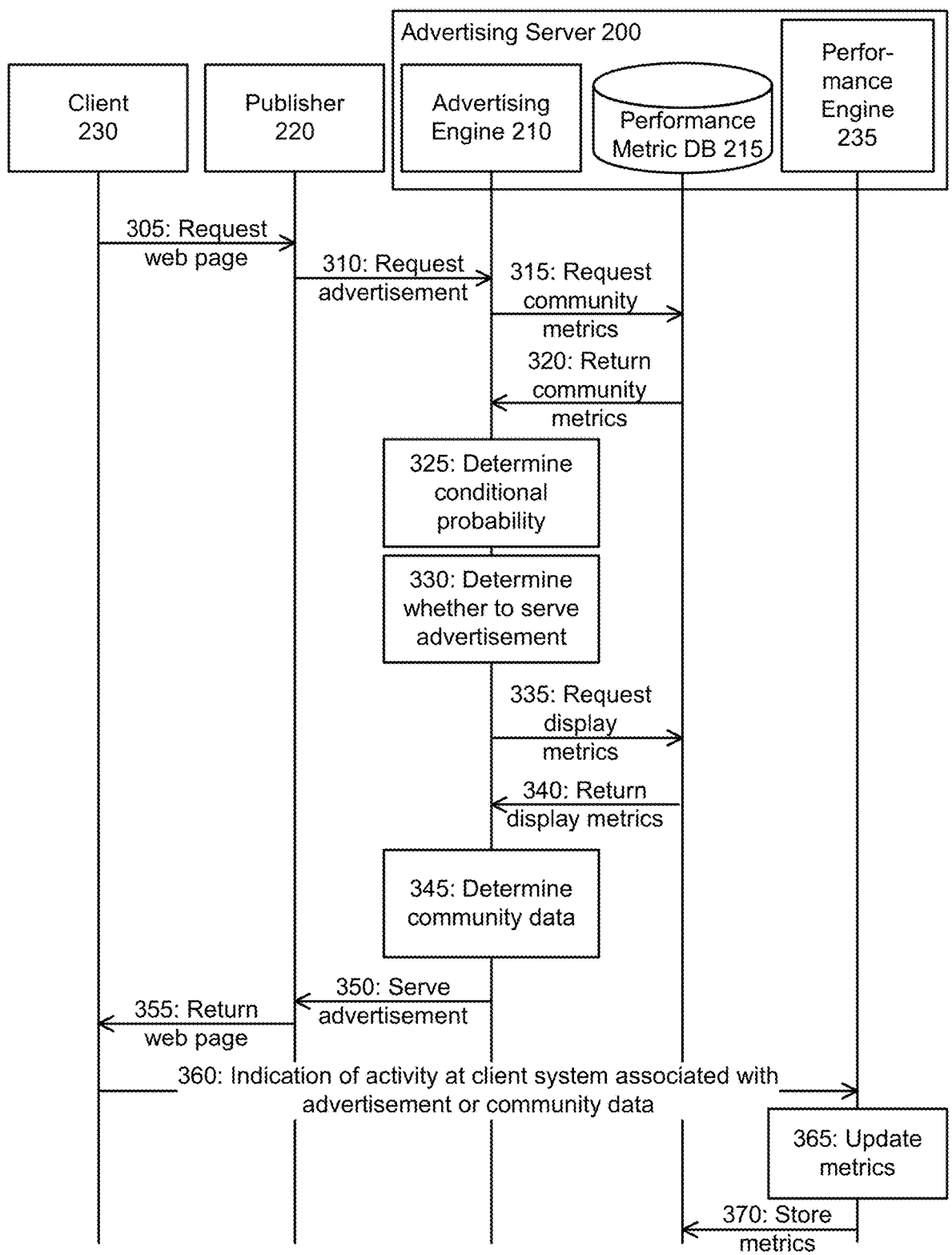
FIG. 3 is an event trace diagram illustrating the determination of an advertisement to serve according to one embodiment.

FIG. 3 is an event trace diagram illustrating determination of an advertisement to serve according to one embodiment. The process, in one embodiment, is executed by the advertising server 200 shown and described in FIG. 2. The user at the client 230 requests 305 a web page from the publisher 220 of the web page. The publisher 220 requests 310 an advertisement from the advertising server 200 to serve to the user along with the requested web page. The advertising engine 210 receives the request for the advertisement as well as one or more attributes of the user to whom the advertisement will be shown. The advertising engine 210 determines the communities to which the user belongs and requests 315, for the advertisement to be shown to the user, the community metrics for those communities. Those metrics are returned 320 by the performance metric database 215. The community metrics are used to determine 325 the conditional probability that the user will interact with the advertisement. Based on the conditional probability, the advertising engine 210 determines 330 whether or not to serve the advertisement. If the conditional probability that the user will interact with the advertisement is too low, the advertising engine 210 will not serve the advertisement.

Example Operation Configuration

In an example, the attributes of the user are that she is female, the web page she requested is the sports section of an online media source, e.g., WALL STREET JOURNAL™, and she's in Honolulu. It can then be determined that the user belongs to the following communities: women, sports fans, people in Honolulu, and people interested in business. The advertisement under consideration to present to this user is for an automobile manufacturer, e.g., HONDA™. The advertisement invites users to go to a dealership to test drive a new car. The community metrics relevant to the determination of the conditional probability are the community metrics for the HONDA™ advertisement when presented to women, sports fans, people in Honolulu and readers of the WALL STREET JOURNAL™.

In one embodiment, the conditional probability for a user is the highest performance of the returned community metrics. In the example, the community metrics are CTR's and the returned CTR's for the HONDA™ advertisement for the communities are as follows: women—0.3; sports fans—0.1; people in Honolulu—0.2; and readers of the WALL STREET JOURNAL™—0.3. The conditional probability for this user when shown the HONDA™ advertisement is therefore 0.3. The threshold for presenting an advertisement to a user is a CTR of 0.2. Since 0.3 exceeds 0.2, the advertising engine 210 will serve the Honda advertisement on the sports page of the WALL STREET JOURNAL™ when it's served to the user by the publisher 220.

In an alternate embodiment, a community is "People Interested in Business" and the data is an aggregate of users reading various business-related publications on-line.

In an alternate embodiment, the individual CTR's are weighted more heavily than others when determining the conditional probability.

After determining that the advertisement will be served, the advertising engine 210 determines 345 which community data to include in the advertisement. Of all of the communities of which this user is a member, she is likely to identify with one or more of the communities more than others. Determining which community data to include in the advertisement is a determination of which communities are most influential to that user and therefore would give the highest likelihood that she will interact with the advertisement.

In the example, there are several options for community data to present as part of the HONDA™ advertisement. The advertisement could include community data associated with any of the communities of which the user is a member. The community metrics for the various communities to which the advertisement is displayed are the basis for the community data presented in the advertisement. In this example, therefore, the options for community data to present are, "85 women will be test-driving a HONDA™," based on, for example, the number of women who have clicked through this advertisement; "5 sports fans will be test-driving a new HONDA™," based on, for example, the number of sports fans who have clicked through this advertisement; "11 people in Honolulu will be test-driving a new HONDA™," based on, for example, the number of people in Honolulu who have clicked through this advertisement; or "18 readers of the WALL STREET JOURNAL™ will be test-driving a new HONDA™" based on, for example, the number of readers of the WALL STREET JOURNAL™ who have clicked through this advertisement. In one embodiment, the data displayed about how many of a certain community of users have clicked on the advertisement is updated continually as the advertisement is displayed to users.

In order to determine which community data to display, display metrics are requested 335 from and returned 340 by the performance metric database 215. The display metrics indicate the performance of the advertisement when displayed with community data about the various communities overall and specifically when shown to the communities of which the user is a member: women, sports fans, people in Honolulu, and readers of the WALL STREET JOURNAL™. The display metrics are displayed below in Table 1.

TABLE 1

Display Metrics

| Community Data | CTR for Women Shown Advertisement with Specified Community | CTR for Sports Fans Shown Advertisement with Specified Community | CTR for People in Honolulu Shown Advertisement with Specified Community | CTR for WALL STREET JOURNAL ™ Readers Shown Advertisement with Specified Community |
|---|---|---|---|---|
| Women | 0.3 | 0.01 | 0.01 | 0.01 |
| Sports Fans | 0.01 | 0.2 | 0.05 | 0.1 |
| People in Honolulu | 0.01 | 0.01 | 0.01 | 0.01 |
| Readers of the WALL STREET JOURNAL ™ | 0.01 | 0.1 | 0.01 | 0.2 |

The highest performance for the HONDA™ advertisement with the communities of which the user is a member is 0.3 when the advertisement is shown to women with the community data about how many women have accepted invitation to test-drive a new car. The advertising engine 210 thus serves 350 the HONDA™ advertisement with the community data about women to the publisher 220 which in turn serves that advertisement when returning 355 the web page requested by the user.

Upon activity at a client system associated with the advertisement or community data, an indication of that activity is received 360 at the performance engine 235. The indication is a signal corresponding to the activity. The indication of the activity is used to update the community and display metrics relevant to that advertisement with that community data and that user. If in the example, the user to whom the advertisement is displayed clicks through the advertisement, her activity is factored into the community metrics and display metrics for all of the user communities of which the user is a member.

The performance engine 235 can update the metrics immediately upon receiving the indication, periodically (for example, hourly or daily), upon receipt of a request for the advertisement or when the processor capacity allows. The updated metrics are stored 370 in the performance metric database 215. In this manner the determination of whether or not to serve an advertisement and if so, what community data to include is made with continually updated performance information about the advertisements. In today's fast-paced world, trends change very quickly and an advertisement that was effective last week, or even yesterday, may not be effective today.

The community data is included in an advertisement in a number of different ways. In one embodiment, the community data is included with the other text of the advertisement. Alternatively, when the advertisement is first provided for display to the user, the community data is not visible to the user. Upon receiving an indication of activity at the client system associated with the advertisement, such as a mouse-over the advertisement, the community data is provided for display to the user. Alternatively, the community data is provided for display after a pre-determined amount of time.

In one embodiment, the community data appears as an overlay over the advertisement. In another embodiment, the advertisement increases in size to allow room to display the community data.

Example Interfaces and Interactions

Example interfaces are provided that illustrate several embodiments of providing advertisements that comprise community data to users.

Figure 4A:
FIGS. 4A and 4B are example screenshots of advertisements wherein community data is provided in response to an activity at the client system.
Figure 4B:

FIGS. 4A and 4B are example screenshots of advertisements wherein community data is provided in response to activity at the client system associated with the advertisement. FIG. 4A shows an example advertisement provided for display to a user. The community data is presented after a pre-determined amount of time has elapsed. Examples of community data being displayed after the pre-determined amount of time has elapsed is discussed further in respect to FIGS. 5A-5D.

In the alternate embodiment illustrated by FIG. 4B, the presence of community data about to be displayed is hinted at by the presence of an icon 410. Alternatively, any graphic, shape or drawing can be used as an icon. After a pre-determined amount of time, the icon expands to become an overlap displaying community data. Alternatively, the icon expands to display the community data a click on the icon by a user. They display of community data is discussed further with respect to FIGS. 5A-5D.

Figure 5A:
FIGS. 5A, 5B, 5C, and 5D are example screenshots of presentation of community data in an advertisement after receiving an indication corresponding to an action at a client system wherein the community data is presented as an overlay through which the advertisement is still visible (slightly blurred portion of image).

FIGS. 5A, 5B, 5C and 5D are example screenshots of presentation of community data as an overlay. The overlay is displayed after a pre-determined amount of time has elapsed after display of an advertisement, such as for example the advertisements shown in FIGS. 4A and 4B. In one embodiment, the overlay is displayed one second after the advertisement is displayed to the user. In another embodiment the overlay is displayed substantially immediately after the advertisement is displayed to the user. In FIG. 5A the community data is presented as a piece of trivia and the user is invited to further interact with the advertisement. The overlay references data about interactions of men in California with that advertisement. This is selected by the advertising engine 210 when the advertisement with that community data has the highest performance either overall or with the communities to which the user to whom the advertisement is being displayed belongs. Note that the advertisement in these embodiments continues to be shown through the scrim (or partially transparent) overlay.

Figure 5B:

The overlay of FIG. 5B references the interactions of users of the advertiser's site, in this case downloading an anti-virus software, and invites the user to also come to the site and download the software. The community data presented is about interactions of users in general with that advertiser's site and is presented if that community data is shown to perform best with the advertisement overall or perform best with the communities to which the user to whom the advertisement is being displayed belongs. In the specific example the best performing display community is the ExampleITSite.com.

Figure 5C:
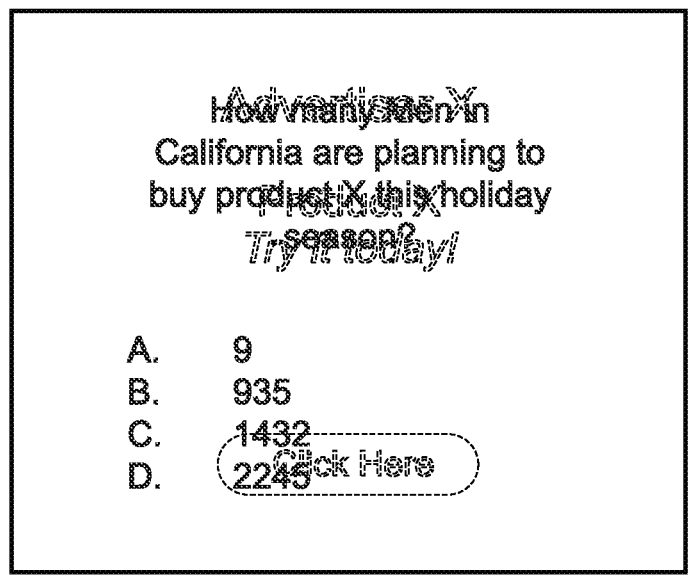

The overlay of FIG. 5C presents community data in the form of a trivia question and the user is invited to interact with the overlay by choosing one of the multiple choice answers to the trivia question. The community data presented references men in California and is chosen by the advertising engine if that community data is shown to perform best with the advertisement overall or perform best with the communities to which the user to whom the advertisement is being displayed belongs.

Figure 5D:
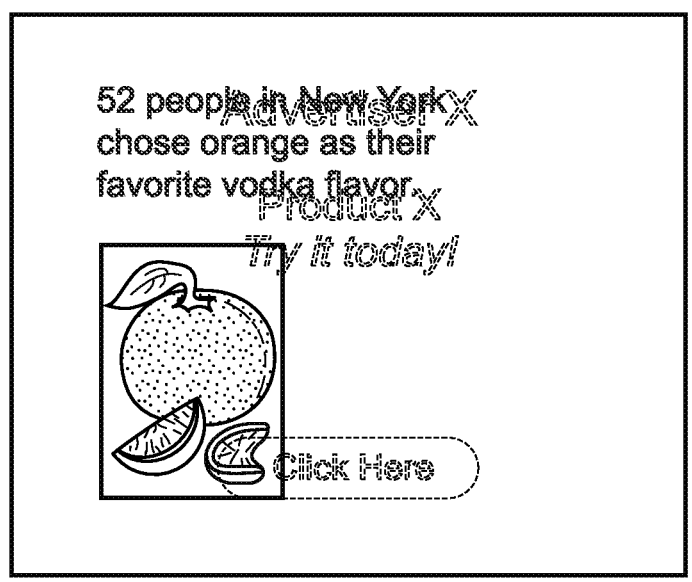

The overlay of FIG. 5D presents community data textually as well as graphically. The community data presented references other users in New York and previous interactions they have had with that advertiser. This is chosen by the advertising engine if that community data is shown to perform best with the advertisement overall or perform best with the communities to which the user to whom the advertisement is being displayed belongs.

FIG. 6 is an example screenshot of an advertisement wherein community data is presented in the first display of the advertisement rather than as an overlay displayed at some time after display of the advertisement. As with community data presented after a activity at the client system, the community data is selected by the advertising engine if it is the community data that performs best overall or with the community to which the user to whom the advertisement is being displayed belongs. In this example the community data referenced is about Baton Rouge, La. and it is likely that this community data performs best with users in and around Baton Rouge. Therefore it is likely that the user to whom this advertisement is being displayed is in Baton Rouge or is associated with Baton Rouge. An example of a user determined to be associated with LSU would be a user whose browsing history indicated that the user had been browsing at www.lsusports.net or at www.lsualumni.org.

ADDITIONAL CONSIDERATIONS

Further, the features and advantages described in the specification provide a beneficial use to those making use of a system and a method as described in embodiments herein. For example, a user is provided mechanisms, e.g., by receiving and/or transmitting control signals, to control access to particular information as described herein. Further, these benefits accrue regardless of whether all or portions of components, e.g., server systems, to support their functionality are located locally or remotely relative to the user.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

In addition, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as engines or code devices, without loss of generality.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative systems and methods for targeting content to users on the Internet using data captured by social media in accordance with the disclosed principles herein. Thus, while particular embodiments and applications have been illustrated and described, it is to be understood that the embodiments are not limited to the precise construction and components disclosed herein and that various modifications, changes and variations which will be apparent to those skilled in the art may be made in the arrangement, operation and details of the method and apparatus disclosed herein without departing from the spirit and scope of the disclosure and appended additional claimable subject matter.

What is claimed is:

1. A computer-implemented method for providing advertisements comprising:

receiving, at a server from a publisher computing device, a request for an advertisement, wherein the request comprises information about a user to whom a webpage with the advertisement is to be displayed;

determining, at the server, at least one community of which the user is a member based on the information about the user;

obtaining, at the server, for a predetermined advertisement, community data associated with each community of which the user is a member, the community data comprising attributes of members of each community;

determining, at the server, a click-through rate for each community of which the user is a member, each click-through rate representing a click-through rate for a plurality of versions of the predetermined advertisement by members of the respective community;

determining, at the server, a conditional probability that the user will interact with the predetermined advertisement, wherein the conditional probability is based on a maximum click-through rate from the click-through rates for each of the at least one community;

responsive to the conditional probability exceeding a threshold:

generating, at the server, a set of versions of the predetermined advertisement from among the plurality of versions of the predetermined advertisement, wherein each version in the set is configured to include community data associated with a particular community of the at least one community of which the user is a member, wherein the community data associated with each version is configured for display on the associated version as a partially transparent overlay, wherein the partially transparent overlay associated with each version comprises text data representative of the community data associated with the particular community to which each version is associated;

determining, at the server, for each combination of: (i) version in the set of versions; and (ii) community in the at least one community of which the user is a member, a click-through rate for the respective version presented to members of the respective community;

selecting, at the server, a version of the predetermined advertisement from the set of versions based on a maximum click-through rate for the respective version presented to members of the respective community;

providing, from the server for display at a client system associated with the user, the selected version of the predetermined advertisement without the community data associated with the selected version of the predetermined advertisement to be included in the webpage provided by the publisher computing device to the client system over a network;

responsive to providing the selected version of the predetermined advertisement without the community data associated with the selected version of the predetermined advertisement, receiving, at the server, a first indication of activity at the client system related to the selected version of the predetermined advertisement; and responsive to receiving the first indication of activity at the client system related to the selected version of the predetermined advertisement, providing, from the server for display at the client system associated with the user, the community data associated with the selected version of the predetermined advertisement;

responsive to providing the community data associated with the selected version of the predetermined advertisement, receiving, at the server, a second indication of activity at the client system related to the selected version of the predetermined advertisement; and updating, at the server, the click-through rate of the selected version of the predetermined advertisement based on the second indication of activity at the client system related to the selected version of the predetermined advertisement, wherein the updating occurs upon receiving the second indication of activity at the client system related to the selected version of the predetermined advertisement.

2. The method of claim 1, wherein the attributes of members comprise one or more of age, profession, gender, family status, interests, hobbies, socio-economic status, and IP address.

3. The method of claim 1, wherein the selected version of the predetermined advertisement comprises graphics representing the community associated with the selected version.

4. A system for serving advertisements comprising:

one or more computers and one or more storage devices storing instructions that are operable, when executed by the one or more computers, to cause the one or more computers to perform operations comprising:

receiving, from a publisher computing device, a request for an advertisement, wherein the request comprises information about a user to whom a webpage with the advertisement is to be displayed;

determining at least one community of which the user is a member based on the information about the user;

obtaining, for a predetermined advertisement, community data associated with each community of which the user is a member, the community data comprising attributes of members of each community;

determining a click-through rate for each community of which the user is a member, each click-through rate representing a click-through rate for a plurality of versions of the predetermined advertisement by members of the respective community;

determining a conditional probability that the user will interact with the predetermined advertisement, wherein the conditional probability is based on a maximum click-through rate from the click-through rates for each of the at least one community;

responsive to the conditional probability exceeding a threshold:

generating a set of versions of the predetermined advertisement from among the plurality of versions of the predetermined advertisement, wherein each version in the set is configured to include community data associated with a particular community of the at least one community of which the user is a member, wherein the community data associated with each version is configured for display on the associated version as a partially transparent overlay, wherein the partially transparent overlay associated with each version comprises text data representative of the community data associated with the particular community to which each version is associated;

determining for each combination of: (i) version in the set of versions; and (ii) community in the at least one community of which the user is a member, a click-through rate for the respective version presented to members of the respective community;

selecting a version of the predetermined advertisement from the set of versions based on a maximum click-through rate for the respective version presented to members of the respective community;

providing, for display at a client system associated with the user, the selected version of the predetermined advertisement without the community data associated with the selected version of the predetermined advertisement to be included in the webpage provided by the publisher computing device to the client system over a network;

responsive to providing the selected version of the predetermined advertisement without the community data associated with the selected version of the predetermined advertisement, receiving, at the server, a first indication of activity at the client system related to the selected version of the predetermined advertisement; and responsive to receiving the first indication of activity at the client system related to the selected version of the predetermined advertisement, providing, from the server for display at the client system associated with the user, the community data associated with the selected version of the predetermined advertisement;

responsive to providing the community data associated with the selected version of the predetermined advertisement, receiving a second indication of activity at the client system related to the selected version of the predetermined advertisement; and updating the click-through rate of the selected version of the predetermined advertisement based on the second indication of activity at the client system related to the selected version of the predetermined advertisement, wherein the updating occurs upon receiving the second indication of activity at the client system related to the selected version of the predetermined advertisement.

5. The system of claim 4, wherein the attributes of members comprise one or more of age, profession, gender, family status, interests, hobbies, socio-economic status, and IP address.

6. The system of claim 4, wherein the selected version of the predetermined advertisement comprises graphics representing the community associated with the selected version.

7. A non-transitory computer-readable medium storing software comprising instructions executable by one or more computers which, upon such execution, cause the one or more computers to perform operations comprising:

receiving, at a server from a publisher computing device, a request for an advertisement, wherein the request comprises information about a user to whom a webpage with the advertisement is to be displayed;

determining, at the server, at least one community of which the user is a member based on the information about the user;

obtaining, at the server, for a predetermined advertisement, community data associated with each community of which the user is a member, the community data comprising attributes of members of each community;

determining, at the server, a click-through rate for each community of which the user is a member, each click-through rate representing a click-through rate for a plurality of versions of the predetermined advertisement by members of the respective community;

determining, at the server, a conditional probability that the user will interact with the predetermined advertisement, wherein the conditional probability is based on a maximum click-through rate from the click-through rates for each of the at least one community;

responsive to the conditional probability exceeding a threshold:

generating, at the server, a set of versions of the predetermined advertisement from among the plurality of versions of the predetermined advertisement, wherein each version in the set is configured to include community data associated with a particular community of the at least one community of which the user is a member, wherein the community data associated with each version is configured for display on the associated version as a partially transparent overlay, wherein the partially transparent overlay associated with each version comprises text data representative of the community data associated with the particular community to which each version is associated;

determining, at the server, for each combination of: (i) version in the set of versions; and (ii) community in the at least one community of which the user is a member, a click-through rate for the respective version presented to members of the respective community;

selecting, at the server, a version of the predetermined advertisement from the set of versions based on a maximum click-through rate for the respective version presented to members of the respective community;

providing, from the server for display at a client system associated with the user, the selected version of the predetermined advertisement without the community data associated with the selected version of the predetermined advertisement to be included in the webpage provided by the publisher computing device to the client system over a network;

responsive to providing the selected version of the predetermined advertisement without the community data associated with the selected version of the predetermined advertisement, receiving, at the server, a first indication of activity at the client system related to the selected version of the predetermined advertisement; and responsive to receiving the first indication of activity at the client system related to the selected version of the predetermined advertisement, providing, from the server for display at the client system associated with the user, the community data associated with the selected version of the predetermined advertisement;

responsive to providing the community data associated with the selected version of the predetermined advertisement, receiving, at the server, a second indication of activity at the client system related to the selected version of the predetermined advertisement; and updating, at the server, the click-through rate of the selected version of the predetermined advertisement based on the second indication of activity at the client system related to the selected version of the predetermined advertisement, wherein the updating occurs upon receiving the second indication of activity at the client system related to the selected version of the predetermined advertisement.

8. The non-transitory computer-readable medium of claim 7, wherein the attributes comprise one or more of age, profession, gender, family status, interests, hobbies, socio-economic status, and IP address.

9. The non-transitory computer-readable medium of claim 7, wherein the selected version of the predetermined advertisement comprises graphics representing the community associated with the selected version.

* * * * *

UNITED STATES PATENT AND TRADEMARK OFFICE
CERTIFICATE OF CORRECTION

| | | |
|---|---|---|
| PATENT NO. | : 11,257,112 B1 | Page 1 of 1 |
| APPLICATION NO. | : 12/580176 | |
| DATED | : February 22, 2022 | |
| INVENTOR(S) | : Massoudi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 883 days.

Signed and Sealed this
Twenty-fifth Day of July, 2023

Katherine Kelly Vidal
*Director of the United States Patent and Trademark Office*